US009860435B2

(12) United States Patent
Mukai

(10) Patent No.: US 9,860,435 B2
(45) Date of Patent: *Jan. 2, 2018

(54) IMAGE CAPTURE DEVICE WITH ROTATABLE LENS UNIT

(71) Applicant: Sony Corporation, Tokyo (JP)

(72) Inventor: Takanori Mukai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/389,040

(22) Filed: Dec. 22, 2016

(65) Prior Publication Data
US 2017/0104908 A1 Apr. 13, 2017

Related U.S. Application Data

(63) Continuation of application No. 14/424,216, filed as application No. PCT/JP2013/071050 on Aug. 2, 2013, now Pat. No. 9,565,345.

(30) Foreign Application Priority Data

Sep. 5, 2012 (JP) ................. 2012-195201

(51) Int. Cl.
H04N 5/225 (2006.01)
G02B 7/02 (2006.01)

(52) U.S. Cl.
CPC ........... *H04N 5/2259* (2013.01); *G02B 7/023* (2013.01); *H04N 5/2254* (2013.01); *H04N 5/2252* (2013.01)

(58) Field of Classification Search
CPC .. H04N 5/2259; H04N 5/2254; H04N 5/2252; G02B 7/023
USPC .......................................................... 348/373
See application file for complete search history.

(56) References Cited

U.S. PATENT DOCUMENTS

| 4,890,713 | A | 1/1990 | Pagano |
| 5,850,579 | A | 12/1998 | Melby et al. |
| 7,520,685 | B2 | 4/2009 | Lee |
| 8,405,766 | B2 | 3/2013 | Tatewaki |
| 9,565,345 | B2 * | 2/2017 | Mukai ................. H04N 5/2252 |
| 2004/0047623 | A1 | 3/2004 | Top et al. |
| 2006/0023113 | A1 | 2/2006 | Lin |

(Continued)

FOREIGN PATENT DOCUMENTS

| CN | 101677362 A | 3/2010 |
| CN | 101873423 A | 10/2010 |

(Continued)

Primary Examiner — Nhan T Tran
(74) Attorney, Agent, or Firm — Wolf, Greenfield & Sacks, P.C.

(57) ABSTRACT

Provided is an image capture device including a lens unit that includes a lens, a supporting member that supports the lens unit and rotates in a predetermined rotating direction with the lens unit, a rotation regulating member that regulates rotation of the supporting member by coming into contact with the supporting member while the supporting member is rotating, and a move permitting part that permits the rotation regulating member being in contact with the supporting member to move a predetermined amount in the rotating direction in a manner that the supporting member is rotatable 360 degrees or more in the rotating direction.

9 Claims, 10 Drawing Sheets

(56) References Cited

U.S. PATENT DOCUMENTS

| | | | |
|---|---|---|---|
| 2006/0147194 A1* | 7/2006 | Jones | H04N 5/2252 396/427 |
| 2008/0231699 A1* | 9/2008 | Konishi | H04N 5/2251 348/143 |
| 2009/0059060 A1* | 3/2009 | Mukai | G03B 37/02 348/347 |
| 2010/0067180 A1* | 3/2010 | Origuchi | H04N 5/2252 361/679.01 |
| 2011/0085253 A1 | 4/2011 | Takano | |
| 2011/0096164 A1 | 4/2011 | Mori et al. | |
| 2014/0248045 A1 | 9/2014 | Wada et al. | |
| 2014/0348498 A1* | 11/2014 | Aiba | H04N 5/2259 396/20 |
| 2015/0326759 A1 | 11/2015 | Mukai | |

FOREIGN PATENT DOCUMENTS

| | | | | |
|---|---|---|---|---|
| JP | 09-070778 A | | 3/1997 | |
| JP | 2007-177902 A | | 7/2007 | |
| JP | 2012032636 A | * | 2/2012 | ............ H04N 5/222 |
| JP | 2012-093579 A | | 5/2012 | |

* cited by examiner (a)

(b)

IMAGE CAPTURE DEVICE WITH ROTATABLE LENS UNIT

CROSS REFERENCE TO RELATED APPLICATIONS

This application is a continuation of and claims the benefit under 35 U.S.C. §120 of U.S. patent application Ser. No. 14/424,216, titled "IMAGE CAPTURE DEVICE," filed on Feb. 26, 2015, which is a U.S. National Stage Application under 35 U.S.C. §371, based on International Application No. PCT/JP2013/071050, filed Aug. 2, 2013, which claims priority to Japanese Patent Application JP 2012-195201, filed Sep. 5, 2012, each of which is hereby incorporated by reference in its entirety.

TECHNICAL FIELD

The present invention relates to an image capture device that captures an image of the surrounding environment while being rotated in a predetermined rotating direction.

BACKGROUND ART

An example of an image capture device is a security camera that captures an image of the surrounding environment while the installation position is fixed. It is desirable for a security camera to have a lens being rotated in a predetermined rotating direction depending on the relationship between the area of which the lens of the security camera can capture an image and the place of which a user of the security camera desires to capture an image.

Patent Literature 1 below discloses a security camera including a lens unit that includes a lens, and a supporting member that supports the lens unit and rotates in pan directions.

CITATION LIST

Patent Literature

Patent Literature 1: JP 2012-93579A

SUMMARY OF INVENTION

Technical Problem

In Patent Literature 1, however, the rotation amount of the lens unit in the pan directions is not regulated. This allows the lens unit to rotate in the pan directions without limitation, which may, for example, cause wires (such as lead wires) connected with the lens unit to he kinked. To avoid this, it is preferable to provide a rotation amount regulation mechanism for regulating the rotation amount of the lens unit.

On the other hand, when, for example, a member for regulating the rotation of the supporting member by coming into contact with the supporting member is provided as a rotation amount regulation mechanism, it is difficult to rotate the lens unit 360 degrees in the pan directions. Such being the case, the function of the security camera as a means for crime prevention may not be exerted fully.

In view of the above, the present disclosure proposes an image capture device capable of rotating a lens unit 360 degrees or more while regulating the rotation amount of the lens unit.

Solution to Problem

According to the present disclosure, there is provided an image capture device including a lens unit that includes a lens, a supporting member that supports the lens unit and rotates in a predetermined rotating direction with the lens unit, a rotation regulating member that regulates rotation of the supporting member by coming into contact with the supporting member while the supporting member is rotating, and a move permitting part that permits the rotation regulating member being in contact with the supporting member to move a predetermined amount in the rotating direction in a manner that the supporting member is able to rotate 360 degrees or more in the rotating direction.

According to the above image capture apparatus, since the rotation regulating member can regulate rotation of the supporting member by coming into contact with the supporting member, it becomes possible to regulate the rotation amount of the lens unit. Further, since the move permitting part permits the rotation regulating member being in contact with the supporting member to move a predetermined amount in the rotating direction in a manner that the supporting member is able to rotate 360 degrees or more in the rotating direction, the lens unit can rotate 360 degrees or more.

Advantageous Effects of Invention

As described above, according to the present disclosure, it is possible to rotate the lens unit 360 degrees or more while regulating the rotation amount of the lens unit.

DESCRIPTION OF EMBODIMENTS

Hereinafter, a preferred embodiment of the present disclosure will be described in detail with reference to the appended drawings. Note that, in this specification and the drawings, elements that have substantially the same function and structure are denoted with the same reference signs, and repeated explanation is omitted.

Note that the description will follow the following order.
1. Example of configuration of image capture device.
2. Position adjustment of pan base in pan directions
3. Example of configuration of lens unit
4. Summary <1. Example of Configuration of Image Capture Device>

With reference to FIG. 1 to FIG. 6, description will be given of an example of a configuration of a security camera 100, which is an example of an image capture device according to an embodiment of the present disclosure.

Figure 1:
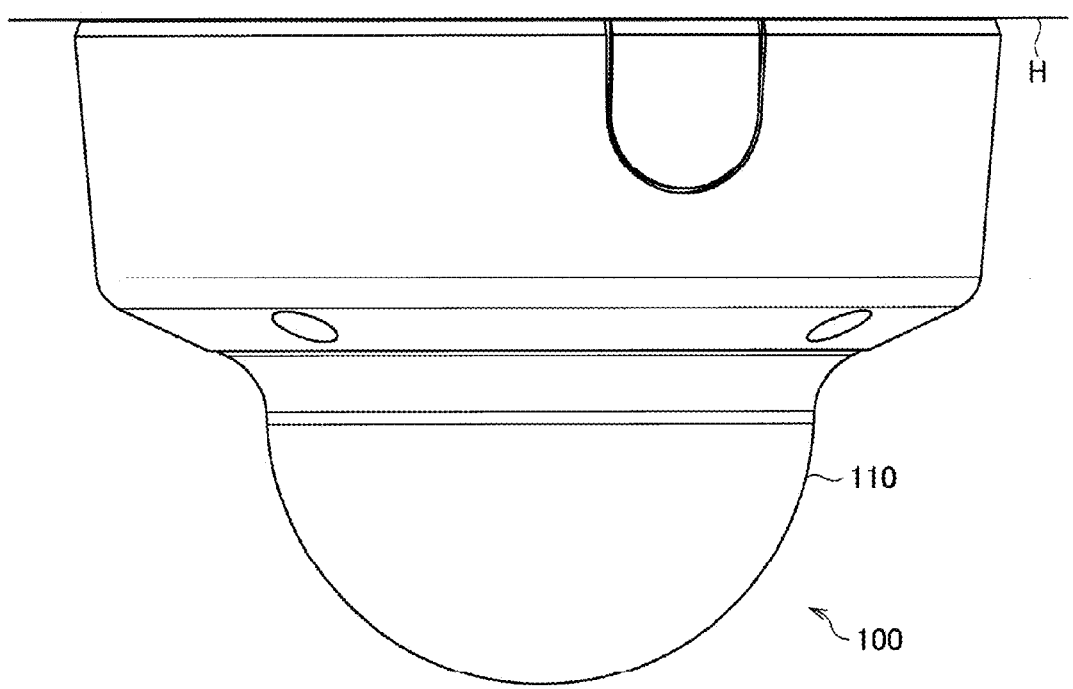
FIG. 1 is a view illustrating an example of an external configuration of a security camera 100 according to an embodiment of the present disclosure.

FIG. 1 is a view illustrating an example of an external configuration of the security camera 100 according to the embodiment of the present disclosure. The security camera 100 is fixed to a horizontal surface H such as a ceiling of a room illustrated in FIG. 1, for example. The security camera 100 includes a lens unit, and captures a video or a still image of the surrounding environment.

The lens unit can capture an image of the surrounding environment at various angles by moving in three types of directions (pan directions, tilt directions, and a rotation direction). Here, the pan directions correspond to directions parallel to the horizontal directions, the tilt directions correspond to directions along the vertical directions, and the rotation direction corresponds to a direction around the optical axis. In this embodiment, the lens unit is moved in the pan directions, the tilt directions, and the rotation direction manually by a user.

Figure 2:
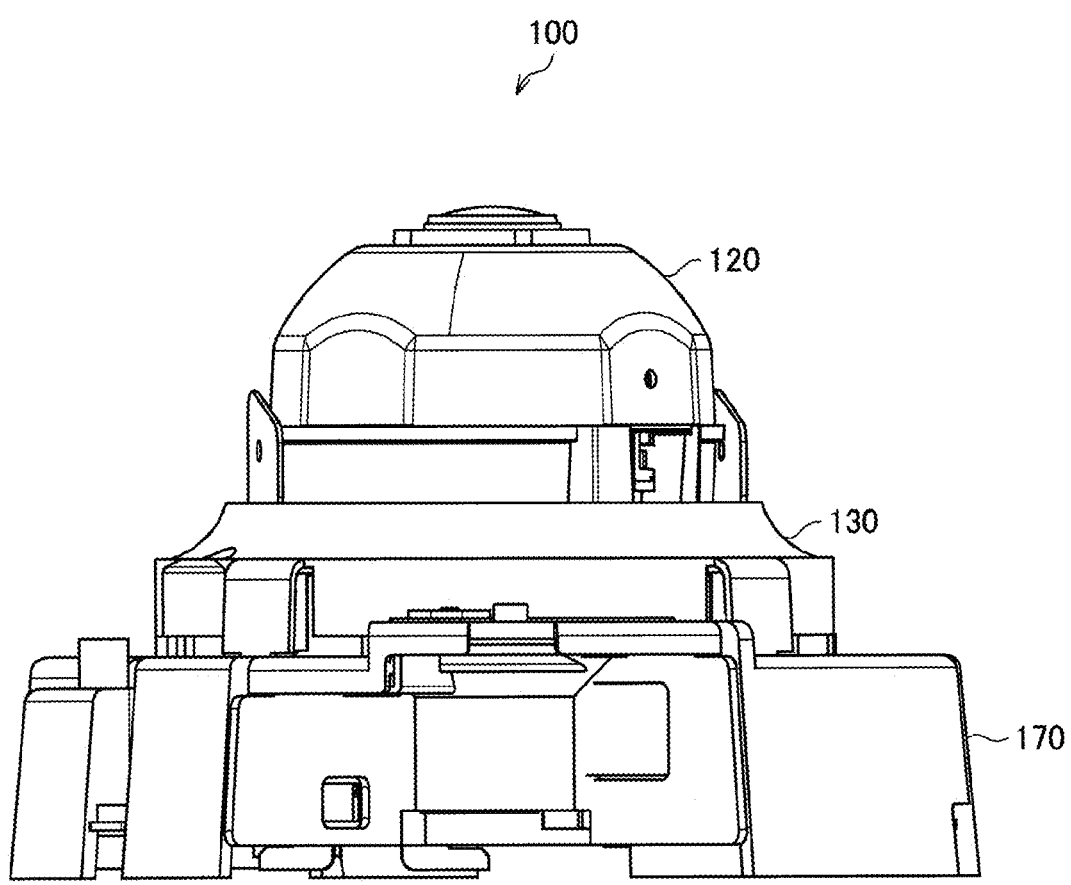
FIG. 2 is a view illustrating the external configuration of the security camera 100 in a state where an exterior cover is removed.
Figure 3:
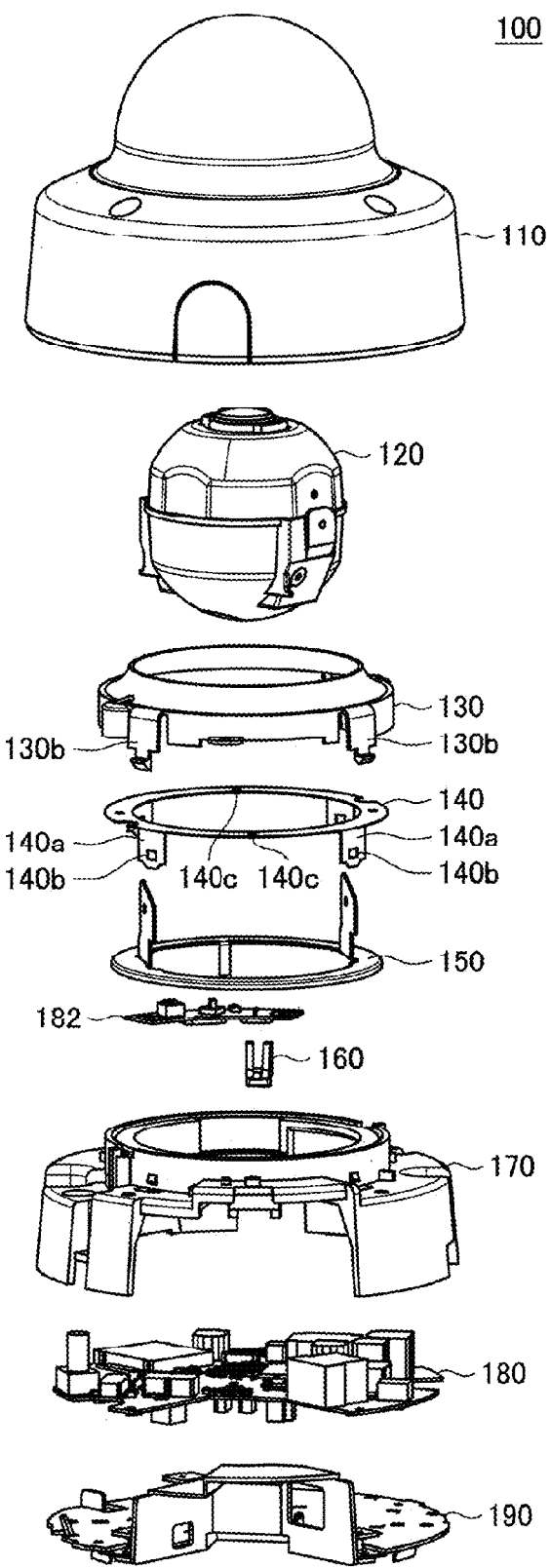
FIG. 3 is an exploded view of the security camera 100.
Figure 4:
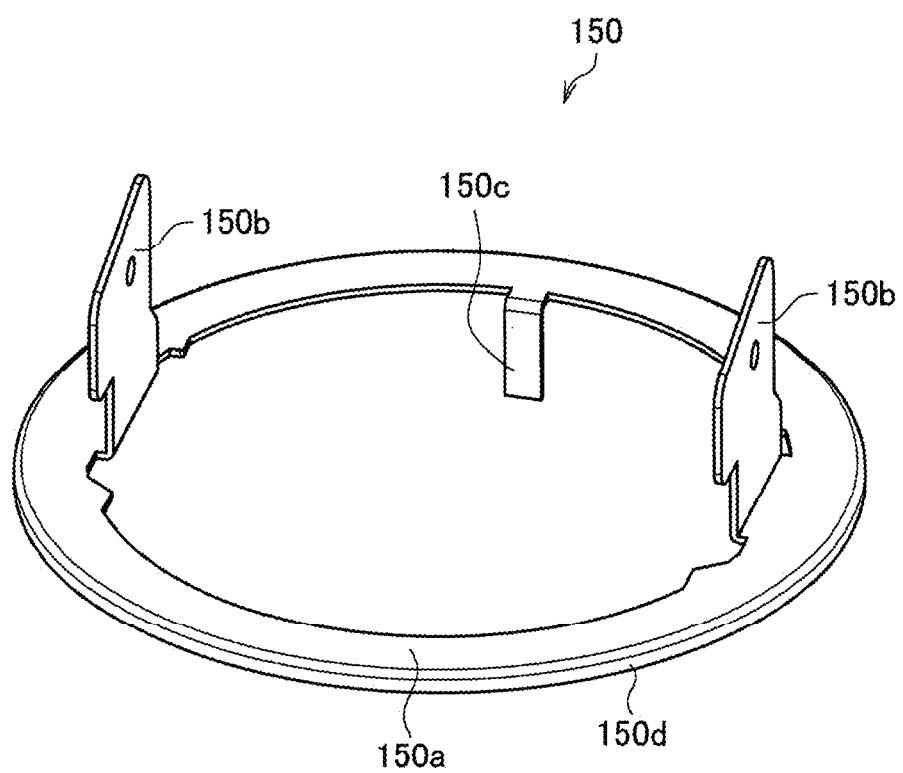
FIG. 4 is a perspective view illustrating an example of a configuration of a pan base 150.
Figure 5:
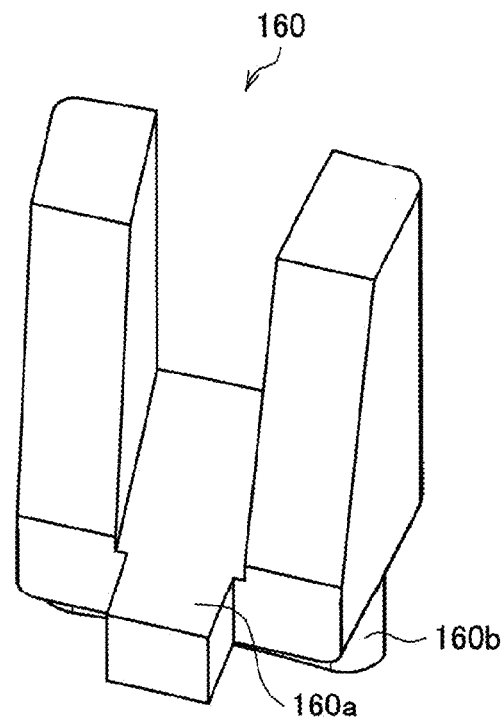
FIG. 5 provides perspective views illustrating an example of a configuration of a stopper 160.
Figure 5:
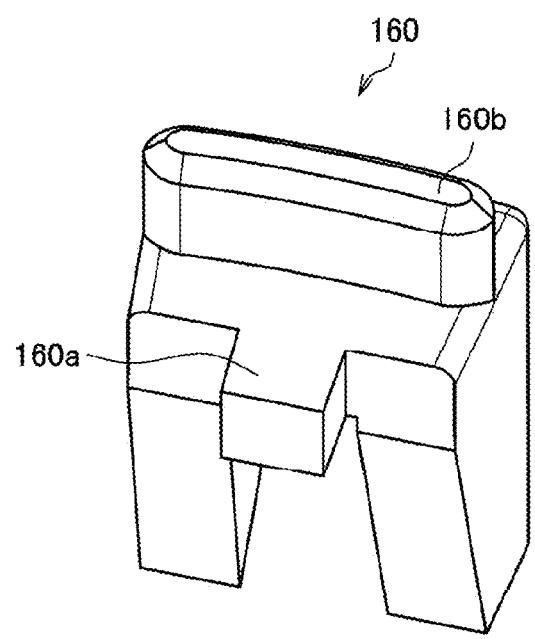
Figure 6:
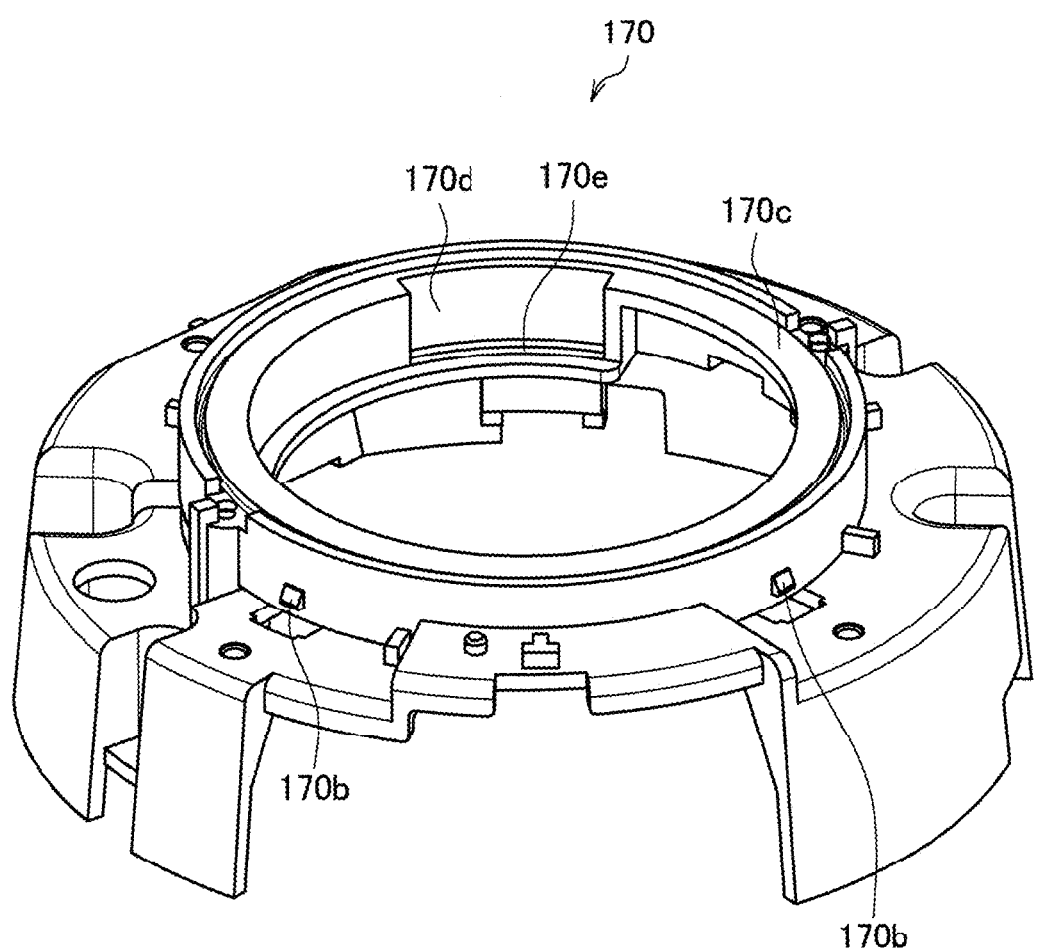
FIG. 6 is a perspective view illustrating an example of a configuration of a chassis 170.

FIG. 2 is a view illustrating the external configuration of the security camera 100 in a state where an exterior cover is moved. FIG. 3 is an exploded view of the security camera 100. FIG. 4 is a perspective view illustrating an example of a configuration of a pan base 150. FIG. 5 provides perspective views illustrating an example of a configuration of a stopper 160. FIG. 6 is a perspective view illustrating an example of a configuration of a chassis 170. Note that FIG. 5(a) is a view of the stopper 160 seen from above, while FIG. 5(b) is a view of the stopper 160 seen from below.

As illustrated in FIG. 3, the security camera 100 includes: an exterior cover 110; a lens unit 120; an inner cover 130; a pan leaf spring 140, which is an example of an elastic member; the pan base 150, which is an example of a supporting member; the stopper 160, which is an example of a rotation regulating member; the chassis 170, which is an example of a base; a main board 180; and a bottom plate 190.

(Exterior Cover 110)

The exterior cover 110 is a cover that covers the part of the security camera 100 excluding the bottom surface. in this embodiment, the exterior cover 110 is made of resin. Ribs are formed on the inner side of the exterior cover 110, and are in contact with the chassis 170. Accordingly, impact exerted on the exterior cover 110 is transferred to the chassis 170.

(Lens Unit 120)

The lens unit 120 includes a lens, image sensors or the like, which generate electrical signals by forming an image from light that has passed through the lens and performing photoelectric conversion. The lens unit 120 is supported by the pan base 150, and is rotatable in the tilt directions and the rotation direction. The lens unit 120 includes therein a base plate, and is connected to wires such as lead wires extended from the outside. Note that a detailed configuration of the lens unit 120 will be described later.

(Inner Cover 130)

The inner cover 130 is made of resin, for example, and covers the pan leaf spring 140. In addition, the inner cover 130 also has the function of protecting a sub board 182 fixed to the upper surface of the chassis 170. To the sub board 182, electronic components such as a switch are attached. The inner cover 130 includes hooks 130b, which engage with the chassis 170. With the hooks 130b thus engaging with the chassis 170, the inner cover 130 is fixed to the chassis 170.

(Pan Leaf Spring 140)

The pan leaf spring 140 is, for example, a circular, plate-shaped flat spring made of metal (such as SUS). The pan leaf spring 140 presses the pan base 150 against the chassis 170. The pan leaf spring 140 includes engagement holes 140b and protrusions 140c.

The engagement holes 140b are formed in four respective bent parts 140a of the pan leaf spring 140. The engagement holes 140b engage with the chassis 170, and thereby the pan leaf spring 140 is fixed to the chassis 170.

The protrusions 140c protrude toward the pan base 150, and are in contact with the pan base 150. For the pan leaf spring 140, the four protrusions 140c are formed at regular intervals in the circumferential direction. The protrusions 140c press the pan base 150 (specifically, a base part 150a). The protrusions 140c are formed by processing the pan leaf spring 140 by raising. Note that, although the protrusions 140c are formed at four portions in FIG. 3, the protrusions 140c are not limited to this and may be formed at three portions or less.

(Pan Base 150)

The pan base 150 has the function of supporting the lens unit 120. In addition, the pan base 150 supports the lens unit 120, and rotates in the pan direction, which is a predetermined rotating direction, with the lens unit 120. The pan base 150 is rotatable in clockwise and counterclockwise pan directions (refer to FIG. 7). As illustrated in FIG. 4, the pan base 150 includes the base part 150a, a pair of supporting parts 150b, and a bent part 150c.

The base part 150a has a circular shape, and is rotatably mounted on the chassis 170. The base part 150a is pressed by the protrusions 140c of the pan leaf spring 140 positioned above. In this way, the position of the pan base 150 is maintained in the state where the pan base 150 is rotated. The pressure of the protrusions 140c is adjusted via the thickness of the pan leaf spring 140 and the protruding amount of the protrusions 140c.

The supporting parts 150b are bent from the base part 150a toward the pan leaf spring 140, and support the lens unit 120. The lens unit 120 is rotatable in the tilt directions with the supporting parts 150b serving as the rotation center.

The bent part 150c is bent from the base part 150a toward the chassis 170, and is contactable to the stopper 160 attached to the chassis 170. When the bent part 150c comes into contact with the stopper 160, the rotation of the pan base 150 in any of the pan directions is regulated. In addition, a bending 150d for increasing the strength of the pan base 150 is formed at the periphery of the base part 150a.

(Stopper 160)

The stopper 160 is made of resin, and is attached to the chassis 170. The stopper 160 regulates rotation of the pan base 150 by coming in contact with the pan base 150 rotating in the pan direction while supporting the lens unit 120. In this embodiment, the stopper 160 comes into contact with the pan base 150 rotating in the clockwise or counterclockwise pan direction and thereby regulates the clockwise or counterclockwise rotation. In this way, the rotation amount of the lens unit 120 in the pan direction can be regulated.

The stopper 160 includes a convex contact part 160a contactable to the bent part 150c of the pan base 150. As illustrated in FIG. 5, the convex contact part 160a is formed at a central portion of the stopper 160. The convex contact part 160a comes into contact with the bent part 150c, and thereby the rotation of the pan base 150 in the pan direction is regulated.

Moreover, the stopper 160 is movably attached to a concave, move permitting part 170d of the chassis 170 so that the stopper 160 would be permitted to move a predetermined amount in the pan directions. The stopper 160 includes a move part 160b (FIG. 5), which moves along the concave, move permitting part 170d. Accordingly, along with rotation of the pan base 150 in any of the pan directions, the move part 160b can move at a predetermined angle in the pan direction while the convex contact part 160a is in contact with the pan base 150. With this configuration, the pan base 150 is permitted to rotate 360 degrees or more in the pan directions while the rotation is regulated by the stopper 160.

(Chassis 170)

The chassis 170 is a base of the security camera 100, and is made by die-casting aluminum, for example. Since the chassis 170 is made by die-casting, it is possible to ensure the fastness property of the security camera 100. The pan base 150 is mounted on the chassis 170 so as to he rotatable in the pan directions. In addition, the sub board 182 (refer to FIG. 3) is attached to the chassis 170. As illustrated in FIG. 6, the chassis 170 includes engagement protrusions 170b, a mount surface 170c, and the concave, move permitting part 170d, which is an example of a move permitting part.

The engagement protrusions 170b engage with the respective engagement holes 140b of the pan leaf spring 140. The engagement protrusions 170b are formed at respective positions corresponding to the four engagement holes 140b. The engagement protrusions 170b engage with the respective engagement holes 140b, and thereby the pan leaf spring 140 is fixed to the chassis 170.

On the mount face 170c, the base part 150a of the pan base 150 is mounted. The base part 150a rotates in any of the pan directions on the mount face 160c, and thereby the lens unit 120 supported by the pan base 150 rotates in the pan direction together.

The concave, move permitting part 170d is a concave part formed in the inner peripheral surface of the chassis 170 to have a predetermined width in the pan directions. In the concave, move permitting part 170d, the stopper 160 is attached. In the concave, move permitting part 170d, a guide groove 170e for guiding move of the move part 160b of the stopper 160 is formed. With this configuration, the concave, move permitting part 170d permits the stopper 160 being in contact with the pan base 150 to move a predetermined amount in the rotating direction (clockwise or counterclockwise), to thereby permit the pan base 150 to be rotatable 360 degrees or more in the pan direction.

Meanwhile, as described above, the ribs formed on the inner side of the exterior cover 110 are in contact with the chassis 170. For this reason, the chassis 170 is subjected to the impact exerted on the exterior cover 110. Since the chassis 170 in this embodiment is made by die-casting, the chassis 170 can withstand at the impact. In addition, since the chassis 170 is subjected to the impact, the exterior cover 110 need not be subjected directly to the impact, and hence is made of resin in this embodiment.

(Main Board 180 and Bottom Plate 190)

The main board 180 is provided with various kinds of electronic components such as circuits necessary for the operation of the security camera 100. The bottom plate 190 is positioned under the main board 180, and the main board 180 is attached to the bottom plate 190. Moreover, the bottom plate 190 is fixed to the horizontal surface H such as a ceiling as that illustrated in FIG. 1.

21 2. Position Adjustment of Pan Base in Pan Directions>

Figure 7:
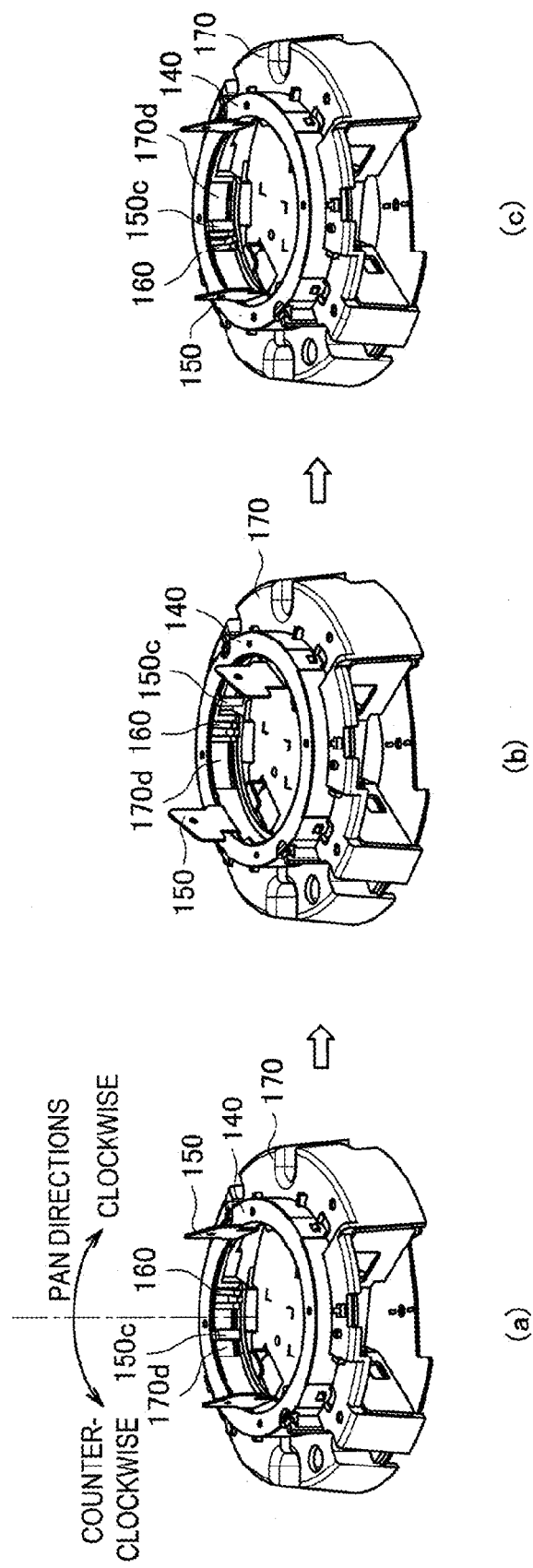
FIG. 7 provides views for explaining position adjustment of the pan base 150 in pan directions.

With reference to FIG. 7, description will be given of position adjustment of the pan base 150, holding the lens unit 12, in the pan directions. The position adjustment of the pan base 150 in the pan directions is performed in this embodiment in such a way that a user rotates the pan base 150 manually.

FIG. 7 provides views for explaining position adjustment of the pan base 150 in one of the pan directions. Note that the lens unit 120 supported by the pan base 150 is not illustrated in FIG. 7 for the purpose of illustration.

The pan base 150 is rotatable in the clockwise and counterclockwise pan directions presented in FIG. 7. in the following, it is assumed that the pan base 150 is rotated counterclockwise from the state illustrated in FIG. 7(a) (first state) to the state illustrated in FIG. 7(b).

When the pan base 150 is further rotated counterclockwise from the state illustrated in FIG. 7(b) (second state), the bent part 150c of the pan base 150 comes into contact with the convex contact part 160a of the stopper 160 attached to the concave, move permitting part 170d. Then, when the user further rotates the pan base 150 counterclockwise, pressure is applied to the stopper 160 by the bent part 150c, and thereby the move part 160b of the stopper 160 moves counterclockwise along the guide groove 170e of the concave, move permitting part 170d.

Then, the user further rotates the pan base 150 counterclockwise, thereby reaching the state illustrated in FIG. 7(c) (third state), that is, a state where the stopper 160 further moves and conies into contact with a side wall of the concave, move permitting part 170d. As is illustrated in FIG. 7(a) and FIG. 7(c), the pan base 150 is rotated 360 degrees or more.

In other words, when the user rotates the pan base 150 counterclockwise in the pan direction, the stopper 160 comes into contact with the pan base 150 to thereby regulate the counterclockwise rotation. At the same time, since the stopper 160 being in contact with the pan base 150 moves counterclockwise in the concave, move permitting part 170d, the lens unit 120 supported by the pan base 150 can rotate in the counterclockwise pan direction 360 degrees or more.

Although description has been given above of the example in which the pan base 150 rotates in the counterclockwise pan direction, the same applies to the case where the pan base 150 rotates clockwise. Specifically, as in the above, in the case of moving from the state illustrated in FIG. 7(c) to the state illustrated in FIG. 7(a), since the stopper 160 moves clockwise in the concave, move permitting part 170d while regulating the clockwise rotation by coming into contact with the pan base 150, the lens unit 120 supported by the pan base 150 can rotate in the clockwise pan direction 360 degrees or more.

<3. Example of Configuration of Lens Unit>

Figure 8:
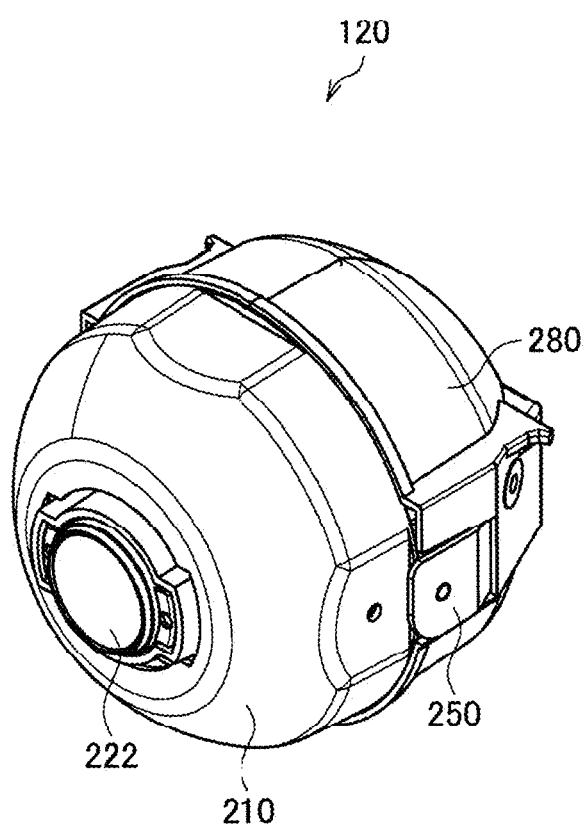
FIG. 8 is a perspective view illustrating an example of an external configuration of a lens unit 120.
Figure 9:
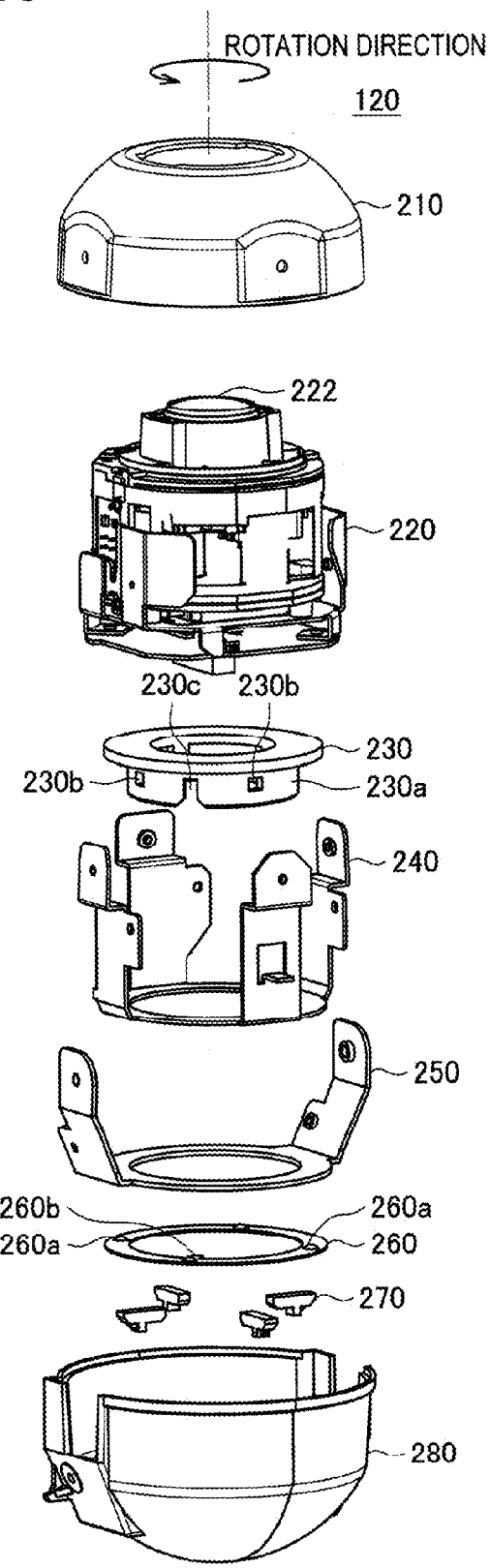
FIG. 9 is an exploded view of the lens unit 120.
Figure 10:
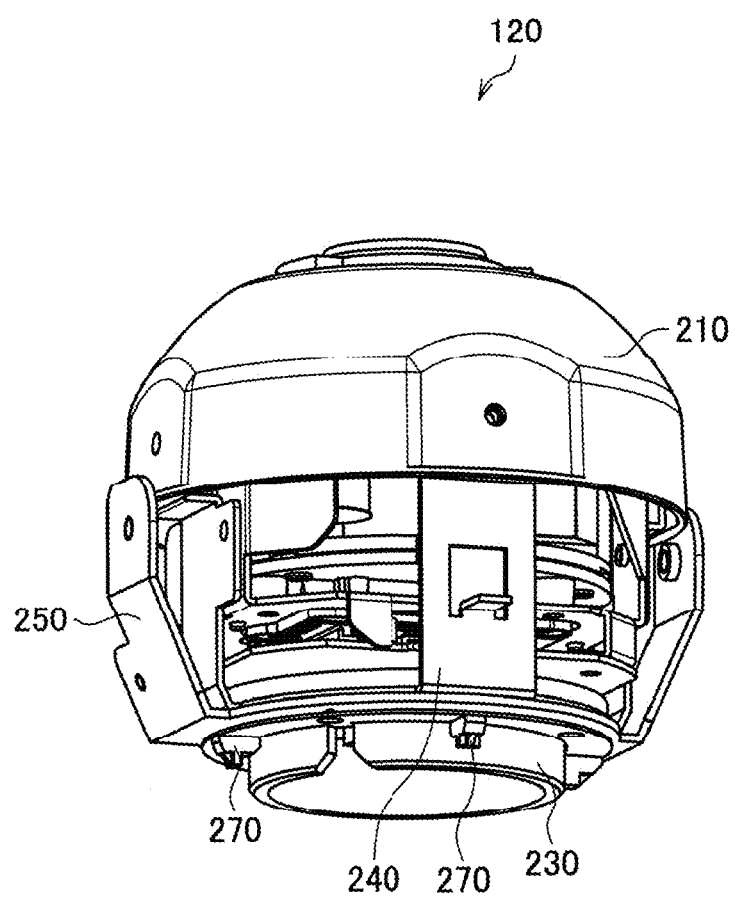
FIG. 10 is a view illustrating the external configuration of the lens unit 120 in a state where a lower case is removed.

With reference to FIG. 8 to FIG. 10, description will be given of an example of a configuration of the lens unit 120.

FIG. 8 is a perspective view illustrating an example of an external configuration of the lens unit 120. FIG. 9 is an exploded view of the lens unit 120. FIG. 10 is a view illustrating the external configuration of the lens unit 120 in a state where a lower case 280 is removed.

As illustrated in FIG. 9, the lens unit 120 includes an upper case 210, a lens holding part 220, a cylindrical member 230, a rotation base 240, a tilt base 250, a rotation leaf spring 260, press members 270, and the lower case 280.

The upper case 210 together with the lower case 280 forms an exterior cover of the lens unit 120. The upper case 210 covers the lens holding part 220, while the lower case 280 covers the rotation base 240, the tilt base 250, and the rotation leaf spring 260. The upper case 210 and the lower case 280 are made of resin, for example.

The lens holding unit 220 is made from steel metal or the like, and holds a lens 222. In the lens holding part 220, a board to which electronic components such as image sensors and the like are attached is fixed. The lens holding part 220 is fixed to the rotation base 240. Accordingly, when the rotation base 240 rotates in the rotation direction, the lens holding part 22.0 also rotates in the rotation direction.

The cylindrical member 230 is made of resin, for example, and is fitted to the rotation base 240, the tilt base 250, and the rotation leaf spring 260. The cylindrical member 230 includes a ring-shaped wall 230a, multiple insertion holes 230b formed in the ring-shaped wall 230a, and a cut-out part 230c.

The ring-shaped wall 230a is a wall protruding toward the lower case 280 and formed in a ring shape. The insertion holes 230b are formed at regular intervals in the ring-shaped wall 230a. In this embodiment, the four insertion holes 230b are formed. The press members 207 are inserted into the four respective insertion holes 230b. The cut-out part 230c is formed by cutting a portion between two of the insertion holes 230b in the ring-shaped wall 230a. A protrusion of the rotation leaf spring 260 is locked in the cut-out part 230c, and thereby rotation of the rotation leaf spring 260 is prevented.

The rotation base 240 supports the lens holding part 220, and rotates in the optical axis direction (rotation direction) with the lens holding part 220. The rotation base 240 includes protrusions contactable to the lower case 280. The protrusions come into contact with the lower case 280, and thereby the rotation of the rotation base 240 is regulated.

The tilt base 250 is supported so as to be rotatable in the tilt directions (vertical directions) with respect to the pan base 150 (FIG. 3). When the tilt base 250 tilts, the lens holding part 220 also tilts.

The rotation leaf spring 260 is, for example, a circular, plate-shaped flat spring made of metal. The rotation leaf spring 260 is positioned below the tilt base 250, and presses the tilt base 250 and the rotation base 240. The rotation leaf spring 260 includes multiple protrusions 260a and a convex locking part 260b.

As the multiple protrusions 260a, four protrusions are formed at regular intervals in the circumferential direction, and protrude toward the tilt base 250 and are thereby in contact with the tilt base 250. The protrusions 260a are formed by raising as the pan leaf spring 140. The convex locking part 260b is formed so as to protrude toward the center in the radius direction. The convex locking part 260b is locked in the cut-out part 230c of the cylindrical member 230, and thereby rotation of the rotation leaf spring 260 is prevented.

The press members 270 are inserted into the respective insertion holes 230b of the cylindrical member 230. The press members 270 come into contact with the rotation leaf spring 260 when being inserted into the insertion holes 230. In this way, the press members 270 press the rotation base 240 and the tilt base 250 via the rotation leaf spring 260. With the pressing by the press members 270, the position of the rotated rotation base 240 is maintained.

<4. Summary>

In the above-described security camera 100, the stopper 160 regulates rotation of the pan base 150 in the pan directions by coming into contact with the pan base 150 rotating with the lens unit 120, which enables regulation of the rotation amount of the lens unit 120 in the pan directions. At the same time, the move permitting, convex part 170d of the chassis 170 permits the stopper 160 being in contact with the pan base 150 to move a predetermined amount in the pan directions so that the pan base 150 can rotate 360 degrees or more in the rotation directions, which consequently allows the lens unit 120 to rotate 360 degrees or more in the pan directions. With this, since the lens unit 120 can capture an image all around in the pan directions even when the stopper 160 is provided, a decrease in the function of the security camera 100 can be prevented.

Note that, although the bent part 150c is formed at the pan base 150, the concave, move permitting part 170d is formed at the chassis 170, and the stopper 160 is configured to move in the concave, move permitting part 170d, in this embodiment, the configuration is not limited to this. For example, a bent part may he formed at the chassis 170, a concave, move permitting part may be formed at the pan base 150, and the stopper 160 may be configured to move in the concave, move permitting part. In this case, as in the above, the lens unit 120 can rotate 360 degrees or more in the pan directions.

Moreover, in the above-described embodiment, description has been given by taking the stopper 160 as an example of a rotation regulating member and the concave, move permitting part 170d as an example of a move permitting part. However, the configuration is not limited to this, and any other configuration may be used as long as being capable of regulating the rotation of the pan base 150 while permitting move of the rotation regulating member.

Moreover, in the above-described embodiment, description has been given of the stopper 160 and the concave, move permitting part 170d for permitting the lens unit 120 to rotate 360 degrees or more in the pan directions. However, the configuration is not limited to this. For example, a stopper and a concave, move permitting part for permitting the lens unit 120 to rotate 360 degrees or more in the rotation direction may be provided.

Moreover, in the above-described embodiment, the lens unit 120 is rotated in the pan directions and the rotation direction manually by the user. However, the configuration is not limited to this. For example, the security camera 100 may automatically rotate the lens unit 120 in the pan directions and the rotation direction.

Moreover, in the above-described embodiment, description has been given by taking the security camera 100 as an example of an image capture device. However, the image capture device is not limited to this. The image capture device may be any device as long as being a camera that captures an image while rotating 360 degrees or more, at least in a predetermined rotating direction.

The preferred embodiment of the present disclosure has been described above in detail with reference to the accompanying drawings, whilst the technical scope of the present disclosure is not limited to the above examples, of course. A person skilled in the art of the present disclosure may find various alterations and modifications within the technical ideas described in the scope of the claims, and it should be understood that they will naturally come under the technical scope of the present disclosure.

Additionally, the present technology may also be configured as below.

(1)
An image capture device including:
a lens unit that includes a lens;
a supporting member that supports the lens unit and rotates in a predetermined rotating direction with the lens unit;
a rotation regulating member that regulates rotation of the supporting member by coming into contact with the supporting member while the supporting member is rotating; and
a move permitting part that permits the rotation regulating member being in contact with the supporting member to move a predetermined amount in the rotating direction in a manner that the supporting member is rotatable 360 degrees or more in the rotating direction.

(2)
The image capture device according to (1), further including:
a base on which the supporting member is mounted rotatably,
wherein the move permitting part is a concave part formed in the base in the rotating direction.

(3)
The image capture device according to (2), wherein the rotation regulating member is rotatably attached to the concave part.

(4)
The image capture device according to any one of (1) to (3),
wherein the supporting member includes
a circular base part, and
a bent part that is bent from the base part, and
wherein the rotation regulating member regulates the rotation of the supporting member by coming into contact with the bent part.

(5)
The image capture device according to any one of (1) to (4),
wherein the supporting member is rotatable clockwise and counterclockwise in the rotating direction,
wherein the rotation regulating member regulates the rotation of the supporting member by coining into contact with the supporting member while the supporting member is rotating clockwise or counterclockwise, and
wherein the move permitting part permits the rotation regulating member being in contact with the supporting member to move the predetermined amount clockwise or counterclockwise.

(6)
The image capture device according to any one of (1) to (5), wherein the predetermined rotating direction is a pan direction parallel to a horizontal direction.

(7)
The image capture device according to any one of (1) to (6),
wherein the supporting member includes
a circular base part, and
a supporting part that is bent from the base part and supports the lens unit,
the image capture device further including:
a plate-shaped elastic member including a plurality of protrusions that press the base part.

REFERENCE SIGNS LIST 100 security camera
120 lens unit
122 lens
140 pan leaf spring
140c protrusion
150 pan base
150a base part
150b supporting part
150c bent part
160 stopper
160a convex contact part
160b move part
170 chassis
170d concave, move permitting part
170e guide groove
220 lens holding part
230 cylindrical member
240 rotation base
250 tilt base
260 rotation leaf spring
270 press member

The invention claimed is:

1. An image capture device comprising:
a lens unit that includes a lens;
a supporting member that supports the lens unit and rotates in a predetermined rotating direction with the lens unit;
a rotation regulating member that regulates rotation of the supporting member by coming into contact with the supporting member while the supporting member is rotating; and
a move permitting part that permits the rotation regulating member being in contact with the supporting member to move a predetermined amount in the rotating direction in a manner that the supporting member is rotatable in the rotating direction, wherein:
the move permitting part provides a concave space; and
the rotation regulating member is located in the concave space of the move permitting part and is movable along the rotating direction in the concave space.

2. The image capture device according to claim 1, wherein the supporting member is rotatable 360 degrees or more in the rotating direction.

3. The image capture device according to claim 1, wherein the rotation regulating member makes contact with an inner surface of the concave space of the move permitting part, whereby movement of the rotation regulating member is stopped.

4. The image capture device according to claim 1, further comprising:
a base on which the supporting member is mounted rotatably, wherein the move permitting part is a concave part formed in the base, and wherein the concave part is elongated in the rotating direction.

5. The image capture device according to claim 4, wherein the rotation regulating member is rotatably attached to the concave part.

6. The image capture device according to claim 1, wherein the supporting member comprises:
a circular base part; and
a bent part that is bent from the base part, wherein the rotation regulating member regulates the rotation of the supporting member by coming into contact with the bent part.

7. The image capture device according to claim 1, wherein:
the supporting member is rotatable clockwise and counterclockwise in the rotating direction;

the rotation regulating member regulates the rotation of the supporting member by coming into contact with the supporting member while the supporting member is rotating clockwise or counterclockwise; and the move permitting part permits the rotation regulating member, while being in contact with the supporting member, to move the predetermined amount clockwise or counterclockwise.

8. The image capture device according to claim 1, wherein the predetermined rotating direction is a pan direction parallel to a horizontal direction.

9. The image capture device according to claim 1, wherein:

the supporting member comprises a circular base part and a supporting part that is bent from the base part and supports the lens unit; and the image capture device further comprises a plate-shaped elastic member having a plurality of protrusions that press on the base part of the supporting member.

\* \* \* \* \*